Figure 1:
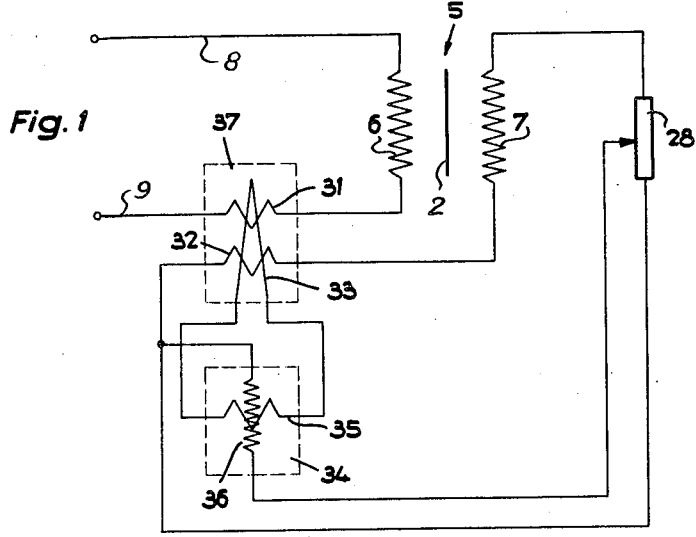

INVENTORS
Willy H. Schlieker
Alexander Mühlinghaus 2,993,166
Patented July 18, 1961

2,993,166
ARRANGEMENT FOR MEASURING THE HYSTERESIS AND EDDY-CURRENT LOSSES OF SHEETS OF FERROMAGNETIC MATERIAL
Willy Hermann Schlieker, Dusseldorf-Meererbusch, and Alexander Mühlinghaus, Wuppertal-Elberfeld, Germany, assignors to Walzwerk Neviges, Willy H. Schlieker & Co., Neviges, Rhineland, Germany
Filed Feb. 10, 1959, Ser. No. 792,308
Claims priority, application Germany Feb. 12, 1958
6 Claims. (Cl. 324—40)

This invention relates to improvements in an arrangement or apparatus for measuring the hysteresis and eddy-current losses of sheets of ferromagnetic material or electroplates.

More particularly, the present invention is concerned with improvements in an arrangement in which the so-called core loss is determined from the watt losses occurring in a measuring coil arrangement consisting of a yoke, a magnetizing coil and an induction coil. Since the watt losses occurring in the measuring circuit itself falsify the measured value and have to be deducted separately each time, a wattmeter with self-correction has been proposed, in which the intrinsic losses in the measuring circuit are deducted automatically from the measured value, so that the indicated value actually gives the watt losses occurring in the sheet alone.

According to the present invention, a differential current transformer in combination with a simple wattmeter is used instead of the above-mentioned wattmeter with self-correction. By means of this improvement, the difference in the currents of the magnetizing coil or winding and the induction coil or winding of the measuring coil arrangement is obtained, and this differential current is then supplied to the simple wattmeter.

In the prior proposed arrangement, of which the present invention is an improvement, the sheets of ferro-magnetic material to be measured for hysteresis and eddy-current losses are taken individually from a stack of plates and placed on the weighing table of a scale provided with a movable pointer or indicator. After the weighing operation, the weighed plate is introduced into a coil body of a measuring coil arrangement around which the magnetizing and induction windings are provided. The measuring coil arrangement includes a yoke extending the length of the coil body, and the plate to be measured rests on the ends of the yoke. After the hysteresis loss of the plate is measured, the plate is removed from the coil body and placed on a stack according to the value determined by the measuring coil arrangement. The weighing scale is associated in an electric circuit connected into a current supply and the windings of the measuring coil arrangement are also connected into a part of the electric circuit and current supply.

In general, the prior arrangement for measuring magnetizing losses or hysteresis losses of sheets or strips of electromagnetic material or electrosheets or plates, wherein for obtaining a constant induction independent of the sheet thickness, the voltage at the magnetizing coil is automatically adjusted in dependence upon the weight of the whole sheet metal plate or of the strip section of the full width of the strip, and for measuring the magnetizing losses, there is provided a wattmeter, the current coil of which is positioned in the magnetizing circuit and the voltage coil of which is located in the measuring circuit, and which for compensating the electric power losses in the regulating circuits and the instruments comprises a second current coil of the wattmeter arranged in the measuring circuit in such a manner that the current flows through the same in the opposite direction to that of the current flow in the first current coil, and in that the voltage at the voltage coil of the wattmeter is controlled automatically in dependence upon the weight of the whole sheet metal plate or of the strip section of the full width of the strip to a constant value.

In the electrical circuit of the prior arrangement, the weighing scale, a percental balance, is provided with a linear scale, the pointer of which is coupled to a potentiometer having a sliding contact which is displaced with the displacement of the pointer in linear proportion. In this manner the measuring tension in the magnetizing winding of the measuring coil arrangement is adjusted in such a way that there is a constant induction in the ferromagnetic sheet being tested, independent of the thickness of the particular sheet. Current for the potentiometer is supplied by a battery and it is connected into one side of a Thoma regulator, which in turn is connected through a sliding contact with a potentiometer connected in parallel with a pair of current supply leads. A rectifier is connected into the sliding contact of the potentiometer and the Thoma regulator on the one hand and into the current inlet lines to the magnetizing winding on the other hand. One side of an intermediate transformer is connected into the current leads to the magnetizing winding and its other side is connected into one of the main current leads and into the sliding contact of the potentiometer connected across the main current leads.

With oscillations in the tension in the main current leads, and consequently, with the oscillations in tension at the intermediate transformer and at the magnetizing coil, the current through the regulating coil of the Thoma regulator will also change. This regulator then displaces the sliding contact of the potentiometer across the main current leads in accordance with the standard value of the tension conditioned by the direct current battery of the scale potentiometer in such a way that immediately the standard value of the tension at the magnetizing coil is restored. The circuit is arranged so that the regulating process resulting from the changes in weight transmitted by the weighing scale is carried out in such a way that with a displacement of the sliding contact of the weighing scale potentiometer, the direct current taken at this potentiometer is changed simultaneously. Since the Thoma regulator exerts a displacing movement, the tension at the magnetizing coil will also change until it has reached the value adjusted for the weighing value.

The circuit for measuring the losses with the prior measuring coil arrangement includes a wattmeter or load gauge having one coil in the current line from the magnetizing coil to one of the leads to the intermediate transformer, and second and third coils carrying current both connected to one terminal of the induction coil. The first and second coils are arranged so that the currents in these coils flow in opposite directions, so that the loss of the primary charge is immediately subtracted, so that there remains only the step of ascertaining the loss occurring in the plate to be measured. The loss index figures, that is, the loss per kg. per plate, is measured by a potentiometer built in the circuit of the induction winding. The potentiometer is connected into the other terminal of the induction winding and into the other terminal of the second wattmeter coil and one terminal of the third wattmeter coil. The other terminal of the wattmeter coil is connected into the sliding contact of the potentiometer. By means of these connections, the reading on the wattmeter or load gauge of the magnetizing and induction coil arrangement is immediately reduced to the unit of weight, and in correspondence with the difference from the standard weight of the plate being measured.

The present invention is more particularly concerned with the improvements referred to above in connection with the means and circuit for measuring the hysteresis and eddy-current losses, that is, the elements connected into the magnetizing and induction coils or windings in which a differential current transformer in combination with a simple wattmeter is employed instead of the self-correcting wattmeter of the prior apparatus as outlined above.

By means of the arrangement according to the present invention, it is possible in a simple manner to adapt the ratios in the measuring arrangement to the existing conditions in the best way, that is with maximum accuracy of indications, since by reducing the number of turns of the induction coil relatively to the magnetizing winding, the transformation ratio of the primary windings of the differential current transformer can be readily adapted to correspond to the new turns ratio. The numbers of turns of the two primary windings of the differential current transformer are always so selected as to counterbalance a transmission ratio differing from unity between magnetizing and induction windings.

In some cases, it may be advantageous for the transformation ratio of the primary coils of the differential current transformer to be left unchanged. The procedure will then preferably be to connect in the primary circuit of the differential current transformer an additional current transformer of variable transformation ratio, by means of which the ratio of the primary currents in the differential current transformer can be readily adapted to the altered numbers of turns of magnetizing winding and induction measuring winding. It is in this case immaterial whether the primary windings of the differential current transformer have the same or different numbers of turns, since this inequality can likewise be picked up and counter-balanced by the additional current transformer. The invention has the advantage over the prior proposal that ordinary commercial instruments and transformers can be used.

Figure 2:
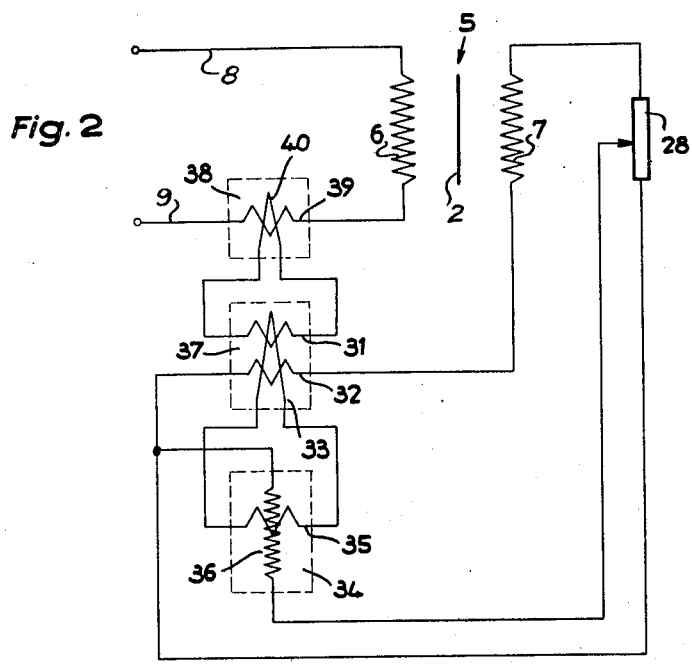

The invention will now be described by way of example with reference to the accompanying drawings, in which:

FIG. 1 is a diagrammatic view showing a measuring arrangement with a differential current transformer in combination with a normal or simple wattmeter, and FIG. 2 is a diagrammatic view showing a modification of the arrangement of FIG. 1.

The measuring arrangements shown in the figures agree in essential parts. The same parts in FIGS. 1 and 2 have, therefore, been provided with the same reference numerals.

In the drawings, the measuring coil arrangement 5 is shown as comprising a magnetizing coil 6 and an induction measuring coil 7 with a sheet 2 of ferromagnetic material between them. The circuit of the induction measuring coil 7 is closed across a loading resistance 28, from the tapping of which is taken the measuring voltage for a voltage coil 36 of a wattmeter 34, and across one primary winding 32 of a differential current transformer 37.

A current coil 35 of the wattmeter 34 forms a closed circuit with the secondary winding 33 of the differential current transformer 37, and the current of the magnetizing coil 6, connected for example into the circuit associated with the weighing scale by leads 8 and 9, flows through a second primary winding 31 of the differential current transformer 37.

The mode of operation of the arrangement of FIG. 1 according to the invention is as follows:

Due to the loading resistance 28 and the voltage coil 36 or 36 or other control members possibly connected thereto, the measuring circuit is additionally loaded and the actual measured result is incorrect. To indicate the actual iron loss value of the sheet direct, these iron losses are compensated in the differential current transformer 37. Since the sum of the loading current and the actual measuring current is passed through the first primary winding 32 of the differential current transformer 37, and only the loading current is passed through the second primary winding 31, only the actual measuring current flows in the secondary winding 33 of the differential current transformer 37. This current is fed to the current coil 35 of the wattmeter 34 and is indicated. The loading resistance 28 is in the form of a potentiometer.

If, now, to reduce the intrinsic losses of the measuring arrangement and thus to increase the measuring accuracy, an alteration of the transformation ratio between magnetizing coil 6 and induction measuring coil 7 is effected, then in a current transformer with, for example, a plurality of primary windings, by means of a simple switching device, it is always possible to satisfy the condition that the alteration on the transformation ratio between coils 6 and 7 of the measuring coil arrangement is counterbalanced by a corresponding alteration of the transformation ratio of the primary coils 32 and 31, so that the value measured by the wattmeter is indicated with maximum accuracy, that is with maximum deflection of the scale pointer.

The constructional example of FIG. 2 differs from that of FIG. 1 in that an additional current transformer 38 with its primary winding 39 and secondary winding 40 is connected in the circuit of the magnetizing coil 6. The primary winding 31 of the differential current transformer 37 is now fed from the secondary winding 40. The loading current of the induction measuring coil 7 flows through the primary winding 32 as in the arrangement of FIG. 1. By this means, a constant turns ratio of the primary coils 31 and 32 can be used for the differential current transformer, and the transformation ratio of the variable current transformer 38 between primary winding 39 and secondary winding 40 can always be so selected that the currents in the primary coils 31 and 32 of the differential current transformer 37 correspond to the turns ratio of the magnetizing winding 6 and the induction measuring winding 7 of the measuring coil arrangement 5.

The invention is applicable to sheets or plates of ferromagnetic material, more particularly Fe—Si plates.

We claim:

1. An arrangement for measuring the iron losses of ferromagnetic sheet material including a measuring coil arrangement comprising a magnetizing coil for magnetizing the ferromagnetic sheet material, an induction coil for generating a voltage by induction from the magnetizing coil, a differential current transformer, a wattmeter having a voltage coil connected to one coil of the differential current transformer to receive voltage from the induction coil and a current coil inductively connected via the differential current transformer to the magnetizing coil and the induction coil, the differential current transformer being connected to supply to the current coil of the wattmeter a current dependent upon the difference between the currents in the magnetizing coil and the induction coil.

2. An arrangement according to claim 1, wherein the differential current transformer has two primary coils connected to the magnetizing coil and the induction coil respectively, the turns ratio of the two primary coils of the differential current transformer being such as to counterbalance a deviation from unity in the turns ratio between the magnetizing coil and the induction coil.

3. An arrangement according to claim 2, wherein the connection between one of the two primary coils of the differential current transformer and the corresponding coil of the measuring coil arrangement comprises a current transformer, the primary coil of which is connected to the corresponding coil of the measuring coil arrangement.

4. An arrangement according to claim 1, wherein means are provided for adjusting the voltage applied across the voltage coil of the wattmeter automatically in dependence upon the thickness of the ferromagnetic sheet material being tested in such a manner that this 5. In an apparatus for measuring the hysteresis losses of ferromagnetic sheet material including a measuring coil arrangement comprising a magnetizing coil for magnetizing the ferromagnetic material and an induction coil for generating a voltage by induction from the magnetizing coil, the improvement comprising a differential current transformer with two primary coils and a secondary coil, a wattmeter having a voltage coil connected to receive voltage from the induction coil through one primary coil of the differential current transformer, and a current coil connected to the secondary coil of the differential current transformer, the primary coils being connected to the measuring coil arrangement so that the secondary coil of the differential current transformer receives a current dependent upon the difference between the currents in the magnetizing coil and the induction coil.

6. An apparatus as claimed in claim 5, wherein an additional current transformer is provided including a primary coil and a secondary coil, the secondary coil being connected to a primary coil of the differential current transformer, and wherein the turns ratio of the coils of said current transformer is variable for adapting said turns ratio to the turns ratio of the measuring coil arrangement.

References Cited in the file of this patent

UNITED STATES PATENTS

| | | |
|---|---|---|
| 2,054,020 | Journeaux | Sept. 8, 1936 |
| 2,861,241 | Leonard et al. | Nov. 18, 1958 |